United States Patent
Kim

(10) Patent No.: US 10,759,434 B2
(45) Date of Patent: Sep. 1, 2020

(54) APPARATUS AND METHOD FOR CONTROLLING TRANSMISSION OF VEHICLE

(71) Applicants: HYUNDAI MOTOR COMPANY, Seoul (KR); KIA MOTORS CORPORATION, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 15/832,036

(22) Filed: Dec. 5, 2017

(65) Prior Publication Data

US 2019/0031196 A1 Jan. 31, 2019

(30) Foreign Application Priority Data

Jul. 31, 2017 (KR) .................... 10-2017-0096864

(51) Int. Cl.
*B60W 30/19* (2012.01)
*B60W 30/18* (2012.01)
*B60W 40/04* (2006.01)

(52) U.S. Cl.
CPC ...... *B60W 30/19* (2013.01); *B60W 30/18072* (2013.01); *B60W 40/04* (2013.01); *B60W 2520/10* (2013.01); *B60W 2540/103* (2013.01); *B60W 2554/00* (2020.02)

(58) Field of Classification Search
CPC .......... B60W 30/19; B60W 30/18072; B60W 40/04; B60W 2520/10; B60W 2540/103; B60W 2550/10; F16H 2059/186; F16H 59/20; F16H 61/16
See application file for complete search history.

(56) References Cited

U.S. PATENT DOCUMENTS

| 7,206,686 B2 * | 4/2007 | Sawamoto ......... B60K 31/0008 180/170 |
|---|---|---|
| 2002/0049116 A1 | 4/2002 | Shiiba et al. |

(Continued)

FOREIGN PATENT DOCUMENTS

| JP | H05-203021 A | 8/1993 |
|---|---|---|
| JP | H06-265010 A | 9/1994 |
| JP | 2005-147215 A | 6/2005 |

(Continued)

*Primary Examiner* — Edwin A Young
(74) *Attorney, Agent, or Firm* — Morgan, Lewis & Bockius LLP

(57) ABSTRACT

An apparatus for controlling a transmission of a vehicle includes a controller which is configured to: set a target vehicle speed of an own vehicle; determine whether to permit a kick down of the transmission of the own vehicle based on the target vehicle speed and a current vehicle speed; determine a target shift stage of the transmission of the own vehicle according to a predetermined transmission pattern based on the current vehicle speed and an open value of an accelerator pedal of the own vehicle; and control the transmission to maintain a current shift stage or to kick down the current shift stage to the target shift stage according to whether to permit the kick down determined by the kick down determination controller when the target shift stage is lower than the current shift stage of the own vehicle.

13 Claims, 4 Drawing Sheets

(56) References Cited

U.S. PATENT DOCUMENTS

2005/0102089 A1* 5/2005 Linden .............. B60K 31/0008
701/96
2013/0225367 A1* 8/2013 Dietzel ................ B60W 10/06
477/97

FOREIGN PATENT DOCUMENTS

JP 2014-190498 A 10/2014
KR 10-2016-0035937 A 4/2016

* cited by examiner

APPARATUS AND METHOD FOR CONTROLLING TRANSMISSION OF VEHICLE

CROSS REFERENCE TO RELATED APPLICATION

The present application claims the benefit of priority to Korean Patent Application No. 10-2017-0096864, filed on Jul. 31, 2017, the entire content of which is incorporated herein for all purposes by this reference.

TECHNICAL FIELD

The present disclosure relates to an apparatus and a method for controlling a transmission of a vehicle, and more particularly, to an apparatus for controlling a transmission of a vehicle capable of blocking an unnecessary kick down control of a transmission by predicting a speed of the vehicle in advance.

BACKGROUND

Generally, a transmission control of a vehicle is performed by a predetermined transmission pattern. Generally, the transmission pattern has predetermined target shift stages which correspond to a speed of a vehicle (vehicle speed) and a throttle position value corresponding to how deep a driver steps on an accelerator pedal.

According to the typical transmission pattern, if the depth of the accelerator pedal that the driver steps on is increased, a kick down transmission for changing the shift stage to a low stage is performed to obtain a larger torque from an engine or a motor which drives a vehicle. However, if the situation where the vehicle speed needs to be reduced after a very short period of time has elapsed after the kick down is performed occurs, vehicle starting (high speed, high torque) to be achieved by the kick down is not performed and only fuel consumption is increased due to the kick down, such that fuel economy of the vehicle may be reduced.

The contents described as the related art have been provided only for assisting in the understanding for the background of the present disclosure and should not be considered as corresponding to the related art known to those skilled in the art.

SUMMARY

An object of the present disclosure is to provide an apparatus and a method for controlling a transmission of a vehicle capable of suppressing an unnecessary kick down transmission by determining whether to perform the kick down by previously predicting a vehicle speed required later when an input from a driver of a vehicle requiring the kick down is generated, thereby increasing fuel economy of the vehicle.

According to an exemplary embodiment of the present disclosure, an apparatus for controlling a transmission of a vehicle includes a controller configured to: set a target vehicle speed of an own vehicle; determine whether to permit a kick down of a transmission of the own vehicle based on a target vehicle speed and a current vehicle speed; determine a target shift stage of the transmission of the own vehicle according to a predetermined transmission pattern based on the current vehicle speed of the own vehicle and a throttle position value of an accelerator pedal; and control the transmission to maintain a current shift stage or to kick down the current shift stage to the target shift stage according to whether to permit the kick down determined by the controller when the target shift stage is lower than the current shift stage of the own vehicle.

The vehicle speed setting controller may receive a set point in front of a traveling direction of the own vehicle and a set speed at the set point, and set a current speed at which an own vehicle is traveled at the set speed when the own vehicle reaches the set point in coasting of the own vehicle to be the target vehicle speed.

The set point may include a position where a traveling monitoring camera is installed, a position where a speed bump is installed, a scheduled left and right turning position, and a position where a road tollgate is installed, and the set speed may be a safe speed required at the set point.

The vehicle speed setting controller may include a data map in which a relationship between a vehicle speed and a coasting distance is determined in advance and stored, and determine, based on the data map, the vehicle speed at which a coasting distance of the vehicle moving by coasting up to the set vehicle speed corresponds to a distance up to the set point and sets the found vehicle speed to be the target vehicle speed.

The vehicle speed setting controller may receive a speed of a forward vehicle traveling in front of a traveling direction of the own vehicle and a vehicle-to-vehicle distance between the own vehicle and the forward vehicle, calculate a difference between a coasting distance of the own vehicle and a coasting distance of the forward vehicle, determine the target speed as a current speed of the forward vehicle if the difference is greater than the vehicle-to-vehicle distance, and determine the target speed as a current speed of the own vehicle if the difference is equal to or smaller than the vehicle-to-vehicle distance.

The vehicle speed setting controller may include a data map in which a relationship between a vehicle speed and a coasting distance is determined in advance and stored, and derive the coasting distance of the own vehicle corresponding to the current speed of the own vehicle and the coasting distance of the forward vehicle corresponding to the current speed of the forward vehicle on the data map.

The kick down determination controller may permit a kick down if the target vehicle speed is greater than the current vehicle speed, and prohibit the kick down if the target vehicle speed is equal to or smaller than the current vehicle speed.

The kick down determination controller may permit the kick down if the target vehicle speed is greater than the current vehicle speed, permit the kick down if the target vehicle speed is equal to or smaller than the current vehicle speed and a lane change intention is input to the own vehicle, and prohibit the kick down if the target vehicle speed is equal to or smaller than the current vehicle speed and the lane change intention is not input to the own vehicle.

According to another exemplary embodiment of the present disclosure, a method for controlling a transmission of a vehicle includes: setting, by a controller, a target vehicle speed of an own vehicle; determining, by the controller, a target shift stage according to a preset transmission pattern based on a current vehicle speed of the own vehicle and a throttle position value of an accelerator pedal; determining, by the controller, whether to permit a kick down of the transmission of the own vehicle based on the target vehicle speed and the current vehicle speed of the own vehicle; determining the target shift stage of the transmission of the own vehicle according to the predetermined transmission pattern based on the current vehicle speed of the own vehicle and the throttle position value of the accelerator pedal; and driving, by the controller, the transmission to maintain the current shift stage or kick down the current shift stage to the target shift stage according to whether to permit the kick down determined in the determining whether to permit the kick down if the target shift stage is lower than the current shift stage of the own vehicle.

In the setting of the target vehicle speed, a set point in front of a traveling direction of the own vehicle and a set speed at the set point may be received and a current speed at which an own vehicle is traveled at the set speed when the own vehicle reaches the set point in coasting of the own vehicle may be set to be the target vehicle speed.

In the setting of the target vehicle speed, a speed of a forward vehicle traveling in front of a traveling direction of the own vehicle and a vehicle-to-vehicle distance between the own vehicle and the forward vehicle may be received, a difference between a coasting distance of the own vehicle and a coasting distance of the forward vehicle may be calculated, the target speed may be determined as a current speed of the forward vehicle if the difference is greater than the vehicle-to-vehicle distance, and the target speed may be determined as a current speed of the own vehicle if the difference is equal to or smaller than the vehicle-to-vehicle distance.

The determining whether to permit the kick down may include: comparing the target vehicle speed with the current vehicle speed; permitting the kick down if the target vehicle speed is greater than the current vehicle speed; and determining the kick down to be prohibited if the target vehicle speed is equal to or smaller than the current vehicle speed.

The determining whether to permit the kick down may include: comparing the target vehicle speed with the current vehicle speed; determining whether a lane change intention is input to the own vehicle if the target vehicle speed is equal to or smaller than the current vehicle speed; permitting the kick down if the target vehicle speed is larger than the current vehicle speed and if the lane change intention is input; and determining the kick down to be prohibited if the lane change intention is not input.

DESCRIPTION OF THE EXEMPLARY EMBODIMENTS

Hereinafter, an apparatus and a method for controlling a transmission of a vehicle according to various exemplary embodiments of the present disclosure will be described in detail with reference to the accompanying drawings.

Figure 1:
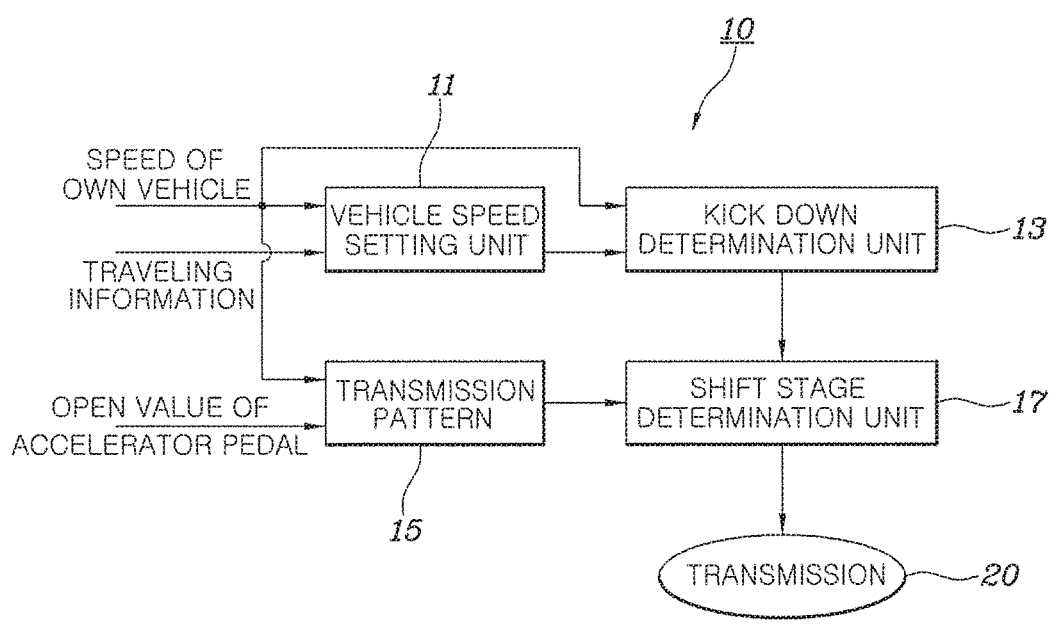
FIG. 1 is a block configuration diagram of an apparatus for controlling a transmission of a vehicle according to an exemplary embodiment of the present disclosure.

FIG. 1 is a block configuration diagram of an apparatus for controlling a transmission of a vehicle according to an exemplary embodiment of the present disclosure.

Referring to FIG. 1, an apparatus 10 for controlling a transmission of a vehicle according to an exemplary embodiment of the present disclosure includes a vehicle speed setting controller 11 configured to set a target vehicle speed of a vehicle to be controlled (hereinafter, referred to as an "own vehicle") that a driver is driving, a kick down determination controller 13 configured to determine whether to permit a kick down of a transmission 20 of the own vehicle based on the target vehicle speed and a current vehicle speed, a transmission pattern controller 15 configured to determine a target shift stage of the transmission 20 of the own vehicle according to a predetermined transmission pattern based on the current vehicle speed of the own vehicle and a throttle position value of an accelerator pedal, and a shift stage determination controller 17 configured to control the transmission 20 to maintain a current shift stage or to kick down the current shift stage to the target shift stage according to whether to permit the kick down determined by the kick down determination controller 13 when the target shift stage is lower than the current shift stage of the own vehicle.

The various embodiments disclosed herein, including embodiments of the apparatus for controlling a transmission of a vehicle and/or elements thereof, can be implemented using one or more controllers, i.e. engine control unit (ECU), to perform the functions described above including the functions described in relation to the vehicle speed setting controller 11, the kick down determination controller 13 and the shift stage determination controller 17.

The vehicle speed setting controller 11 is an element that receives information on the set speed that the own vehicle which is traveling needs to obey later in the course of driving and sets the target vehicle speed based on the set speed and a distance to a set position which is a position where the set speed needs to be obeyed.

Although not illustrated, the information on the set speed and the set point provided to the vehicle speed setting controller 11 may be generated by navigation or the like that may provide positional information of an own vehicle and road information of the area in which the own vehicle is traveling.

For example, the navigation installed in the own vehicle may provide the vehicle speed setting controller with an installation position of a speed monitoring camera installed on a road and limit speed information of a road while the own vehicle is traveling. In this case, the vehicle speed setting controller 11 may set the current target speed so that the vehicle may travel at a speed lower than the limit speed of the road at the position where the speed monitoring camera is installed.

As another example, the navigation installed in the own vehicle may provide the vehicle speed setting controller with information on an installation position of a speed bump installed on a road while the own vehicle is driving. In this case, the vehicle speed setting controller 11 may set the current target speed so that the vehicle speed may be a safe speed (predetermined speed) at which the vehicle may safely pass the speed bump at the position where the speed bump is installed.

As another example, the navigation installed in the own vehicle may provide the vehicle speed setting controller with information on a position where a left turn or a right turn on a traveling route is required during the traveling route execution. In this case, the vehicle speed setting controller 11 may set the current target speed so that the vehicle speed may be a safe speed (predetermined speed) at which the vehicle may safely turn at the position where the vehicle needs to turn left or right.

As another example, the navigation installed in the own vehicle may provide the vehicle speed setting controller with information on a position of a road tollgate through which the vehicle needs to pass during the traveling route execution. In this case, the vehicle speed setting controller 11 may set the current target speed so that the vehicle speed may be the safe speed (predetermined speed) at which the vehicle may safely pass the road tollgate.

If a radar device or the like capable of deriving a speed and a distance of a forward vehicle that is traveling in front of an own vehicle is installed, the vehicle speed setting controller 11 may receive the information on the speed of the forward vehicle and the distance from the forward vehicle from the radar device and set the current target speed at which the distance between the own vehicle and the forward vehicle may be safely maintained.

Figure 2:
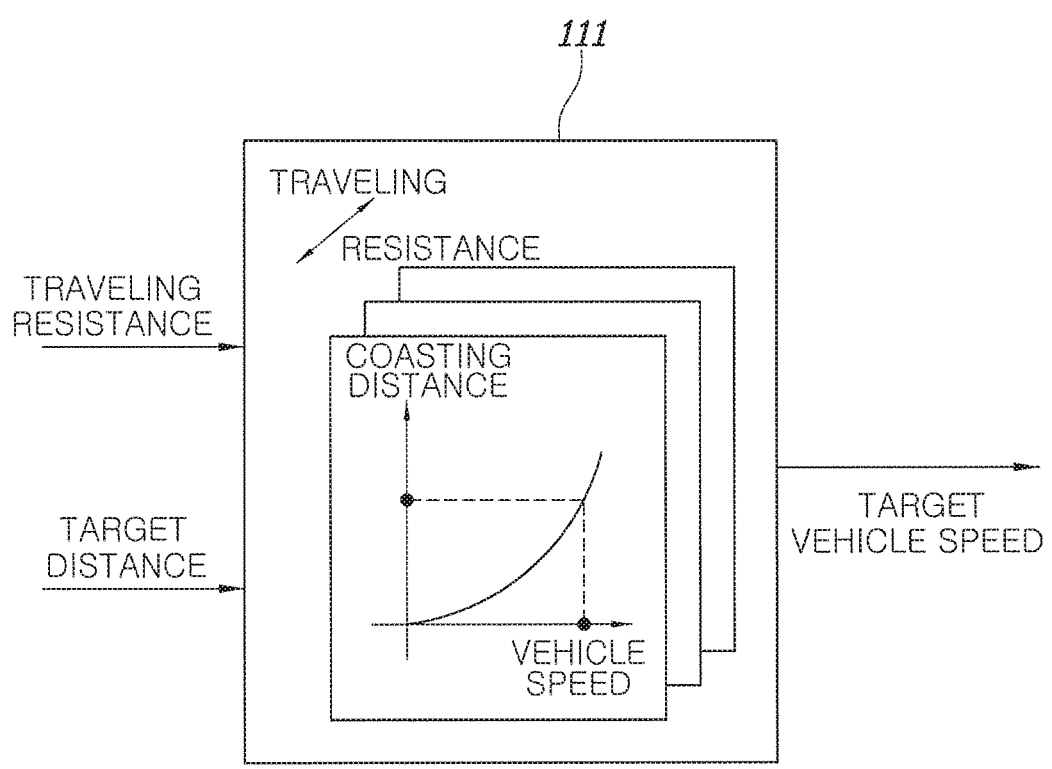
FIGS. 2 and 3 are block diagrams illustrating a detailed configuration of a vehicle speed setting controller of the apparatus for controlling a transmission of a vehicle according to an exemplary embodiment of the present disclosure.
Figure 3:
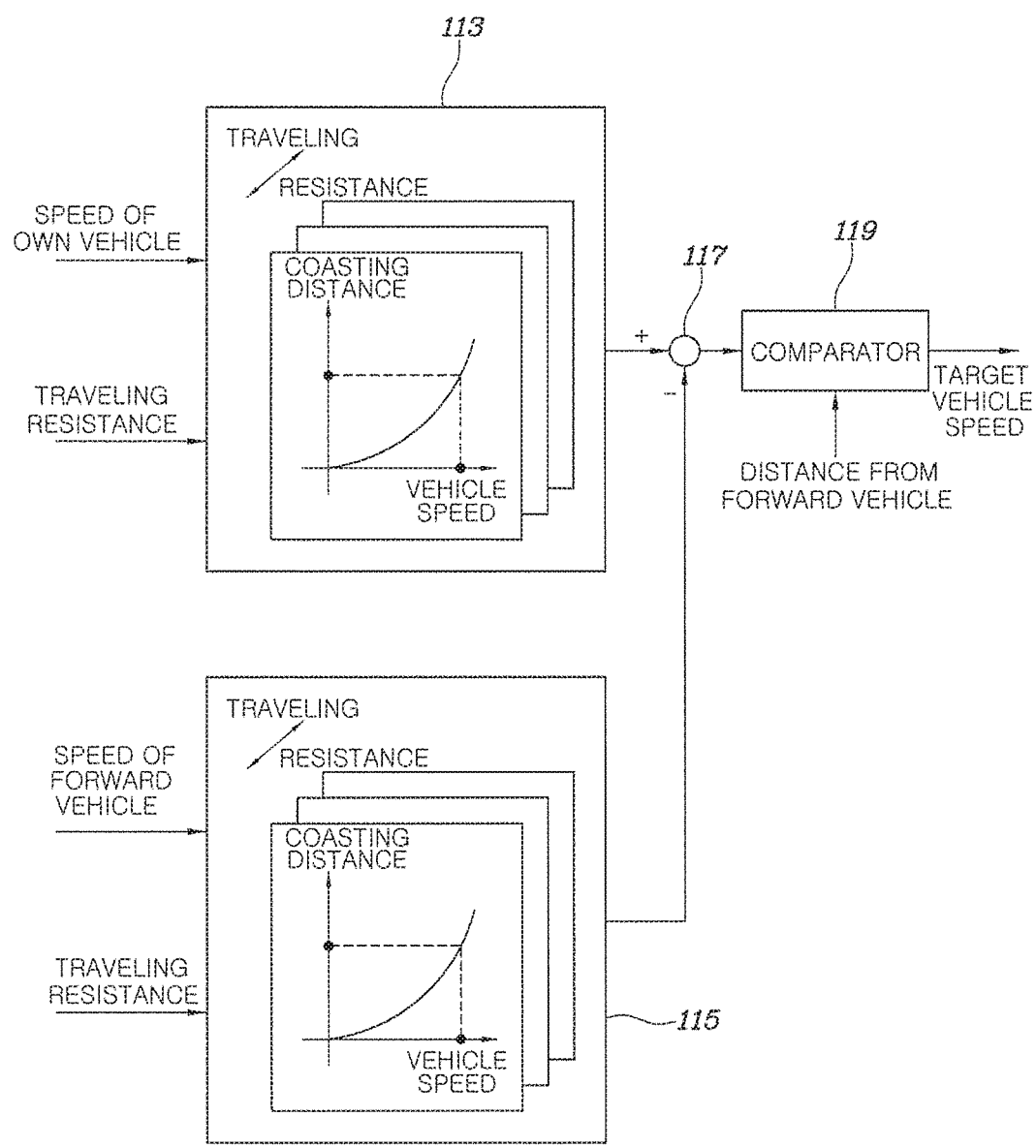

FIGS. 2 and 3 are block diagrams illustrating a detailed configuration of a vehicle speed setting controller of the apparatus for controlling a transmission of a vehicle according to an exemplary embodiment of the present disclosure.

FIG. 2 illustrates an example in which the vehicle speed setting controller 11 sets a target vehicle speed when information on a set speed and a set point is provided through navigation or the like, in which the vehicle speed setting controller 11 may include a data map 111 in which the relationship between a vehicle speed and a coast driving distance is predetermined and stored.

The data map 111 shows the relationship between the coast driving distance (hereinafter, referred to as 'coasting distance') and the vehicle speed. If the vehicle speed is input, the data map 111 may output the coast driving distance corresponding to the vehicle speed. The data map 111 may also output the vehicle speed corresponding to the coast driving distance, if the coast driving distance is input. In addition, the data map 111 may store the relationship between the coast driving distance and the vehicle speed for each traveling resistance. Here, the traveling resistance may be determined in various ways such as an inclination of the vehicle, a road surface state, forward vehicle information, driver's driving mode setting or the like. The traveling resistance can be provided by allowing some of controllers in the vehicle to calculate information provided by sensors, operator inputs or the like.

The vehicle speed setting controller 11 may receive the set point (for example, a speed monitoring camera, a speed bump, left and right turning positions, a road tollgate, or the like) in front of a traveling direction of an own vehicle and a set speed (for example, a predetermined safe speed such as a legal limit speed of a road) at the set point, and may set, by using the data map 111, a current speed at which an own vehicle may be traveled at a set speed to be the target vehicle speed when the own vehicle reaches the set point in coasting of the own vehicle from now.

FIG. 3 illustrates elements which enable the vehicle speed setting controller 11 to set a current target speed at which an own vehicle may safely keep a distance between the own vehicle and the forward vehicle when the vehicle speed setting controller 11 receives information on a speed of the forward vehicle and a distance from the forward vehicle from the radar device or the like installed in the own vehicle.

Similar to FIG. 2, the vehicle speed setting controller 11 may include data maps 113 and 115 that preset and store the relationship between the vehicle speed and the coast driving distance and elements 117 and 119 that calculate and compare information output from the data maps 113 and 115.

The data map 113 may receive the information on the current vehicle speed and the traveling resistance of the own vehicle and output the coasting distance corresponding thereto, and the data map 115 may receive the information on the vehicle speed and the traveling resistance of the forward vehicle in front of the own vehicle which is input by a radar or the like and output the coasting distance of the forward vehicle corresponding thereto.

The subtractor 117 may calculate the difference between the coasting distance of the own vehicle output from the data map 113 and the coasting distance of the forward vehicle output from the data map 115, and the comparator 119 may set the target speed to be the current speed of the forward vehicle when the difference output from the subtractor 117 is greater than the distance from the forward vehicle in front of the own vehicle which is input from the radar and set the current speed of the own vehicle to be the target speed when the difference output from the subtractor 117 is equal to or smaller than the distance from the forward vehicle in front of the own vehicle which is input from the radar.

The kick down determination controller 13 determines that the kick down is permitted when the target vehicle speed determined by the vehicle speed setting controller 11 is greater than the current vehicle speed and the kick down is prohibited when the target vehicle speed is equal to or smaller than the current vehicle speed. For example, even if the driver steps on the accelerator pedal to request the increase in the vehicle speed, the kick down determination controller 13 determines that the vehicle speed should be reduced soon if the target vehicle speed is smaller than or equal to the current vehicle speed, such that it may perform a control not to permit the kick down.

On the other hand, the kick down determination controller 13 may consider whether or not a lane change intention is input to the vehicle in addition to the information on the target vehicle speed determined by the vehicle speed setting controller 11 in determining whether or not to permit the kick down. If the driver wishes to change the lane while stepping on the accelerator pedal, it may be to overtake a vehicle. In this case, it is more preferable to allow kick down as acceleration is required in a rapid time. Here, the lane change intention may be determined based on an input of a turn indicator or the like by a driver.

In summary, the kick down determination controller 13 may always permit the kick down If the target vehicle speed is greater than the current vehicle speed, permit the kick down if the target vehicle speed is equal to or smaller than the current vehicle speed and the lane change intention is input to the own vehicle, and prohibit the kick down if the target vehicle speed is smaller than or equal to the current vehicle speed and the lane change intention is not input to the own vehicle.

The transmission pattern controller 15 determines and outputs the shift stage corresponding to the speed of the own vehicle and the throttle position value of the accelerator pedal with reference to the stored transmission pattern, and the shift stage determination controller 17 may control the transmission 20 only if it is determined that the kick down determination controller 13 permits the kick down when the shift stage determined by the transmission pattern controller 15 is lower than the current shift stage of the own vehicle to perform the kick down of the shift stage.

The vehicle speed setting controller 11, the kick down determination controller 13, the transmission pattern controller 15, and the shift stage determination controller 17 described above may be implemented by a kind of controller including a processor and a memory. In addition, a certain margin value may be included in numerical values (for example, the safe speed, the vehicle-to-vehicle distance, the current vehicle speed, etc.) used for the calculation or the comparison operation which is performed by each element.

Figure 4:
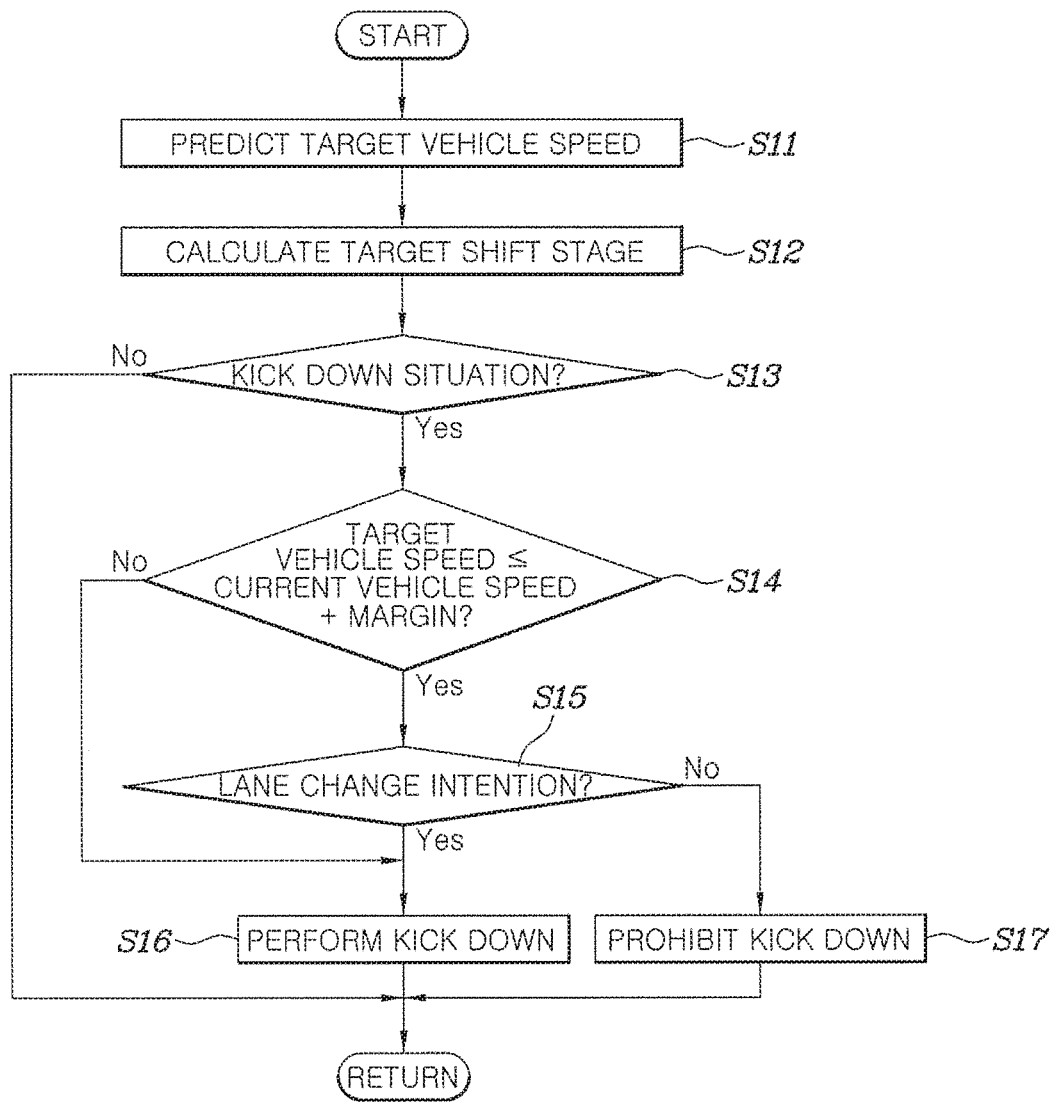
FIG. 4 is a flow chart of a method for controlling a transmission of a vehicle according to an exemplary embodiment of the present disclosure.

FIG. 4 is a flow chart of a method for controlling a transmission of a vehicle according to an exemplary embodiment of the present disclosure. The method for controlling a transmission of a vehicle illustrated in FIG. 4 may be implemented by the operation of the apparatus for controlling a transmission of a vehicle configured as described above.

Referring to FIG. 4, in the method for controlling a transmission of a vehicle according to the exemplary embodiment of the present disclosure may start from determining the target vehicle speed by the vehicle speed setting controller 11 (S11) and calculating the target shift stage by the transmission pattern controller 15 (S12).

Next, if the target shift stage calculated by the transmission pattern controller 15 is lower than the current shift stage of the own vehicle, that is, if it is determined that kick down is required (S13), the kick down determination controller 13 determines whether to permit the kick down (S14 and S15). The determining of whether or not the kick down is required (S13) may be performed in a part of all the elements that can know the information on the shift stage newly determined according to the transmission pattern. For example, the transmission pattern controller 15 determining the shift stage may perform the calculation, and the kick down determination controller 13 and the shift stage determination controller 17 may receive and determine the shift stage information determined by the transmission pattern controller 15. As another example, although not illustrated, another controller that requires the shift stage information may also receive the shift stage information to determine whether the kick down is required.

Next, the kick down determination controller 13 may compare the target vehicle speed with the current vehicle speed (S14), the shift stage determination controller 17 instructed to always permit the kick down if the target vehicle speed is greater than the current vehicle speed may control the transmission 20 to perform the kick down (S16), the shift stage determination controller 17 instructed to permit the kick down if the target vehicle speed is equal to or smaller than the current vehicle speed and the lane change intention is input to the own vehicle may control the transmission 20 to perform the kick down, and the shift stage determination controller 17 may prohibit the kick down if the target vehicle speed is equal to or smaller than the current vehicle speed and the lane change intention is not input (S17).

As described above, the method for controlling a transmission of a vehicle according to the exemplary embodiment of the present disclosure may suppress the unnecessary kick down transmission by determining whether to perform the kick down by previously predicting the vehicle speed required later without performing the kick down as soon as the input from the driver of the vehicle requiring the kick down is generated according to the predetermined transmission pattern, thereby increasing the fuel economy of the vehicle.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An apparatus for controlling a transmission of a vehicle, the apparatus comprising a controller which is configured to:
    set a target vehicle speed of an own vehicle, wherein the target vehicle speed is determined based on a vehicle-to-vehicle distance between the own vehicle and a forward vehicle traveling in front of a traveling direction of the own vehicle and a difference between a coasting distance of the own vehicle and a coasting distance of the forward vehicle;
    determine whether to permit a kick down of a transmission of the own vehicle based on the target vehicle speed and a current vehicle speed;
    determine a target shift stage of the transmission of the own vehicle according to a predetermined transmission pattern based on the current vehicle speed and a throttle position value of an accelerator pedal of the own vehicle; and
    control the transmission to maintain a current shift stage or to kick down the current shift stage to the target shift stage according to whether to permit the kick down determined by the controller when the target shift stage is lower than the current shift stage of the own vehicle.

2. The apparatus of claim 1, wherein the controller receives a set point in front of the traveling direction of the own vehicle and a set speed at the set point, and sets a current speed at which the own vehicle is traveled at the set speed when the own vehicle reaches the set point in coasting of the own vehicle to be the target vehicle speed.

3. The apparatus of claim 2, wherein the set point includes a position where a traveling monitoring camera is disposed, a position where a speed bump is disposed, a scheduled left and right turning position, and a position where a road tollgate is disposed, and the set speed is a predetermined speed required at the set point.

4. The apparatus of claim 2, wherein the controller includes a data map, in which a relationship between a vehicle speed and a coasting distance is predetermined and stored, and
    wherein the controller determines, based on the data map, the vehicle speed at which the coasting distance of the own vehicle which moves by coasting up to the set vehicle speed corresponds to a distance up to the set point and sets the determined vehicle speed to be the target vehicle speed.

5. The apparatus of claim 1, wherein the controller receives a speed of the forward vehicle traveling in front of the traveling direction of the own vehicle and the vehicle-to-vehicle distance between the own vehicle and the forward vehicle, calculates the difference between the coasting distance of the own vehicle and the coasting distance of the forward vehicle, determines the target vehicle speed as a current speed of the forward vehicle if the difference is greater than the vehicle-to-vehicle distance, and determines the target vehicle speed as a current speed of the own vehicle if the difference is equal to or smaller than the vehicle-to-vehicle distance.

6. The apparatus of claim 5, wherein the controller includes a data map in which a relationship between a vehicle speed and a coasting distance is predetermined and stored, and derives the coasting distance of the own vehicle corresponding to the current speed of the own vehicle and the coasting distance of the forward vehicle corresponding to the current speed of the forward vehicle on the data map.

7. The apparatus of claim 1, wherein the controller permits the kick down if the target vehicle speed is greater than the current vehicle speed, and prohibits the kick down if the target vehicle speed is equal to or smaller than the current vehicle speed.

8. The apparatus of claim 1, wherein the controller permits the kick down if the target vehicle speed is greater than the current vehicle speed, permits the kick down if the target vehicle speed is equal to or smaller than the current vehicle speed and a lane change intention is input to the own vehicle, and prohibits the kick down if the target vehicle speed is equal to or smaller than the current vehicle speed and the lane change intention is not input to the own vehicle.

9. A method for controlling a transmission of a vehicle, the method comprising:
- setting, by a controller, a target vehicle speed of an own vehicle, wherein the target vehicle speed is determined based on a vehicle-to-vehicle distance between the own vehicle and a forward vehicle traveling in front of a traveling direction of the own vehicle and a difference between a coasting distance of the own vehicle and a coasting distance of the forward vehicle;
- determining, by the controller, a target shift stage according to a preset transmission pattern based on a current vehicle speed of the own vehicle and a throttle position value of an accelerator pedal;
- determining, by the controller, whether to permit a kick down of the transmission based on the target vehicle speed and the current vehicle speed of the own vehicle;
- determining, by the controller, the target shift stage of the transmission of the own vehicle according to the preset transmission pattern based on the current vehicle speed of the own vehicle and the throttle position value of the accelerator pedal; and
- driving, by the controller, the transmission to maintain a current shift stage or kick down the current shift stage to the target shift stage according to whether to permit the kick down determined in the determining whether to permit the kick down if the target shift stage is lower than the current shift stage of the own vehicle.

10. The method of claim 9, wherein in the setting of the target vehicle speed, a set point in front of the traveling direction of the own vehicle and a set speed at the set point are received and a current speed at which the own vehicle is traveled at the set speed when the own vehicle reaches the set point in coasting of the own vehicle is set to be the target vehicle speed.

11. The method of claim 9, wherein in the setting of the target vehicle speed, a speed of the forward vehicle traveling in front of the traveling direction of the own vehicle and the vehicle-to-vehicle distance between the own vehicle and the forward vehicle are received, the difference between the coasting distance of the own vehicle and the coasting distance of the forward vehicle is calculated, the target vehicle speed is determined as a current speed of the forward vehicle if the difference is greater than the vehicle-to-vehicle distance, and the target vehicle speed is determined as a current speed of the own vehicle if the difference is equal to or smaller than the vehicle-to-vehicle distance.

12. The method of claim 9, wherein the determining whether to permit the kick down includes:
- comparing the target vehicle speed with the current vehicle speed;
- permitting the kick down if the target vehicle speed is greater than the current vehicle speed; and
- determining the kick down to be prohibited if the target vehicle speed is equal to or smaller than the current vehicle speed.

13. The method of claim 9, wherein the determining whether to permit the kick down includes:
- comparing the target vehicle speed with the current vehicle speed;
- determining whether a lane change intention is input to the own vehicle if the target vehicle speed is equal to or smaller than the current vehicle speed;
- permitting the kick down if the target vehicle speed is larger than the current vehicle speed and if the lane change intention is input; and
- determining the kick down to be prohibited if the lane change intention is not input.

* * * * *